United States Patent

[11] 3,548,812

| [72] | Inventors | Thomas O. Paine<br>Administrator of the National Aeronautics<br>and Space Administration with Respect to<br>an Invention of;<br>James D. Frost, Jr., Houston, Tex. 77036 |
|---|---|---|
| [21] | Appl. No. | 8,498 |
| [22] | Filed | Feb. 4, 1970 |
| [45] | Patented | Dec. 22, 1970 |

[54] EEG SLEEP ANALYZER AND METHOD OF OPERATION
19 Claims, 9 Drawing Figs.

| [52] | U.S. Cl. | 128/2.1 |
|---|---|---|
| [51] | Int. Cl. | A611 5/05 |
| [50] | Field of Search | 128/2.1, 2.16(Digest), 213 |

[56] References Cited
UNITED STATES PATENTS

| 2,690,178 | 9/1954 | Bickford | 128/213 |
|---|---|---|---|
| 3,032,029 | 5/1962 | Cunningham | 128/2.1 |
| 3,123,768 | 3/1964 | Burch et al. | 128/2.1 |
| 3,513,834 | 5/1970 | Suzuki et al. | 128/2.1 |

FOREIGN PATENTS

| 806,703 | 6/1951 | Germany | 128/2.16 |
|---|---|---|---|

*Primary Examiner*—William E. Kamm
*Attorneys*—W. A. Marcontell, Marvin F. Matthews and G. T. McCoy ABSTRACT: Apparatus and method for quantitatively measuring brain activity as an automatic indication of level of consciousness. Amplitude weighted signals representative of frequency of brain activity are generated and combined to produce a level of consciousness output signal, which signal may be monitored and recorded.

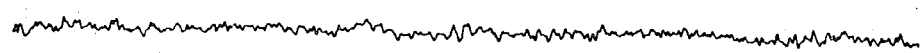
FIG. 1  AWAKE, ALERT, EYES OPEN
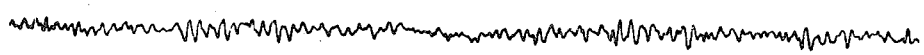
FIG. 2  AWAKE, RELAXED, EYES CLOSED
FIG. 3  STAGE 1 SLEEP (DROWSINESS)
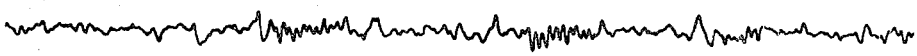
FIG. 4  STAGE 2 SLEEP (LIGHT SLEEP)
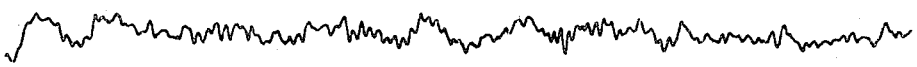
FIG. 5  STAGE 3 SLEEP (MODERATELY DEEP SLEEP)
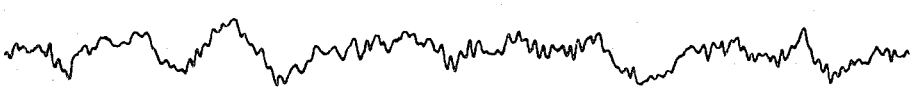
FIG. 6  STAGE 4 SLEEP (DEEP SLEEP)

PATENTED DEC 22 1970

INVENTOR.
James D. Frost, Jr.
BY
ATTORNEYS

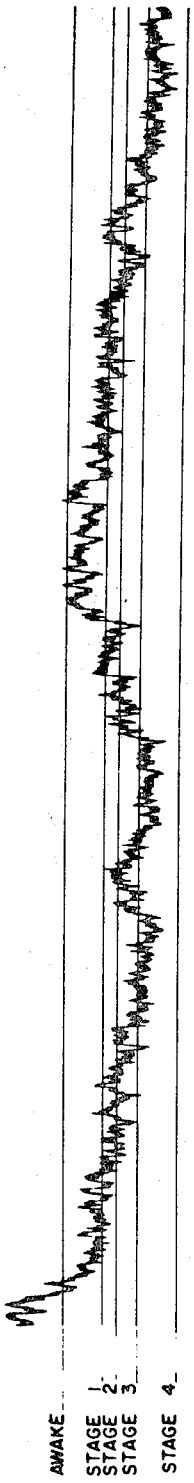
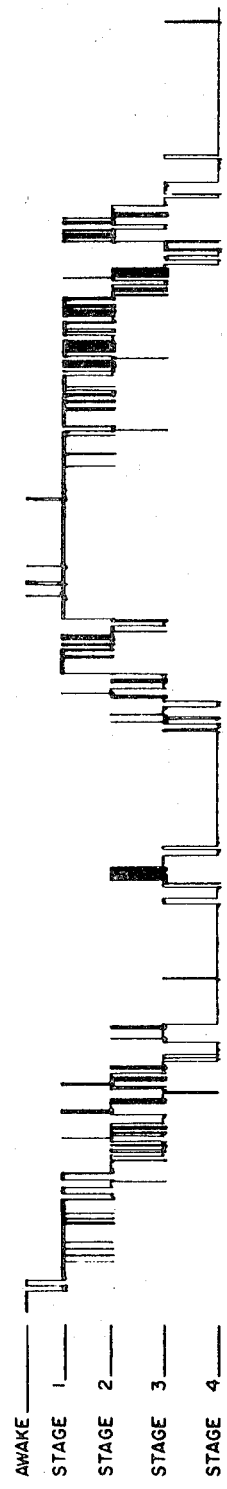
Fig. 9

EEG SLEEP ANALYZER AND METHOD OF OPERATION

ORIGIN OF THE INVENTION

The invention described herein was made in the performance of work under a NASA contract and is subject to the provisions of Section 305 of the National Aeronautics and Space Act of 1958, Public Law 85–568(72 Stat. 435; 42 U.S.C. 2457).

BACKGROUND OF THE INVENTION

1. Field of the Invention

This invention relates to an apparatus and method for quantitatively measuring brain activity as an indication of level of consciousness. More particularly, the invention relates to an apparatus and method for generating amplitude weighted signals representative of various brain-wave (electroencephalogram or EEG) frequencies and combining and integrating these signals to generate an output signal representative of level of consciousness.

2. Description of the Prior Art

In many medical investigatory and treatment situations, it it necessary to determine a patient's depth of sleep. While a number of physiological variables such as heart rate, blood pressure and respiration rate show some correlation to depth of sleep, there is general agreement that a properly recorded and interpreted electroencephalogram (EEG) is the most dependable indicator of the occurence of sleep and of the various stages of sleep.

Manual interpretation and scoring of an EEG recording by a skilled electroencephalographer involves examination of the complex brain-wave signal. This examination may require several hours of analysis for each hour of recording.

Several prior art methods have been utilized to automatically evaluate sleep. Most of these methods require multiple processing of EEG information and consequently fail to provide a continuous and instantaneous determination of level of sleep.

While delayed readout is acceptable in some situations, many applications demand an instantaneous determination of level of sleep. For example, in manned space flight monitoring, the presence or absence of sleep, as well as its moment-to-moment level and total amount are extremely important variables in determining adequate rest-wake cycles. Similarly, delayed EEG interpretation is useless to the anesthesiologist, since the administration of anesthetic requires momentary determination of the patient's level of consciousness.

Other automatic prior art devices have been suggested which will give a continuous direct indication of level of sleep. However, these devices are designed to analyze only one criterion of brain activity, either frequency or amplitude, in reaching a decision. Since neither factor alone is truly indicative of level of sleep, these devices are of limited accuracy.

The problem of obtaining a relatively continuous and accurate analysis of EEG recordings might be overcome at considerable expense by providing enough electroencephalographers to allow overlapping and continuing human interpretation of discrete portions of an EEG recording. Even this solution, however, is not practicable for use over an extended period of time. Likewise, human interpretation is not practicable where the interpreter and the patient are physically separated if there are insufficient transmission facilities therebetween to allow the interpreter to receive a continuous EEG recording.

SUMMARY OF THE INVENTION

It is therefore an object of this invention to provide an improved apparatus and method for quantitatively measuring brain activity as an indication of level of consciousness, which invention overcomes the aforesaid shortcomings of the prior art. Briefly stated, this invention contemplates quantitatively measuring and analyzing brain activity as an indication of level of consciousness. It includes sensing brain-wave activity and generating a first signal representative thereof. When the amplitude of the first signal successively surpasses two predetermined magnitudes, a second signal is generated; and, similarly, when the amplitude surpasses a third magnitude, a third signal is generated. The second and third signals are then combined and integrated to provide an output signal indicative of level of consciousness. Means are provided for reading out variations in the output signal as indications of the level of consciousness.

BRIEF DESCRIPTION OF THE DRAWINGS

Reference to the drawings will further explain the invention wherein like numerals refer to like parts and in which:

FIGS. 1—6 represent typical electroencephalograph recordings of brain activity while the subject experiences various levels of consciousness, as indicated, with electrodes placed in the left central and left occipital regions of the skull.

FIG. 9 is a recording of a typical output signal from integration circuit 17 shown in FIG. 7, and the corresponding six level stepped output recording from analogue addition circuit 35.

DESCRIPTION OF THE PREFERRED EMBODIMENT

An expert electroencephalographer examines variations in both the amplitude and the frequency of an EEG recording in making a judgment concerning level of consciousness. The EEG recording shown in FIG. 1 is illustrative of the alert waking state and is best characterized by the presence of variable amplitude 8 to 12 cycle per second activity (alpha rhythm) and by the lack of any significant lower frequency components. As the subject relaxes and closes his eyes, the amplitude of the alpha rhythm increases as indicated in FIG. 2. As shown in FIG. 3, drowsiness, or stage I sleep, is characterized by the disappearance or marked reduction of alpha amplitude, coincident with the appearance of slower, 5 to 7 cycle per second theta activity of low or moderate voltage. Light sleep, or stage II, is illustrated in FIG. 4 and is characterized by an increase in the theta amplitude and the appearance of occasional high voltage, sharp transients. Moderately deep sleep, or stage III, as shown in FIG. 5, continues to exhibit the features of stage II, but there is also the appearance of slower intermittent delta activity (below 5 cycles per second) of low or moderate amplitude. The deepest, or stage IV, sleep, shown in FIG. 6, is characterized by higher voltage, slower and essentially continuous delta activity. Although other features are commonly associated with various stages of sleep, the changes in amplitude and frequency described above are the most consistent and illustrative features of the various stages and are susceptible to analysis by the automatic processing means of this invention.

Figure 7:
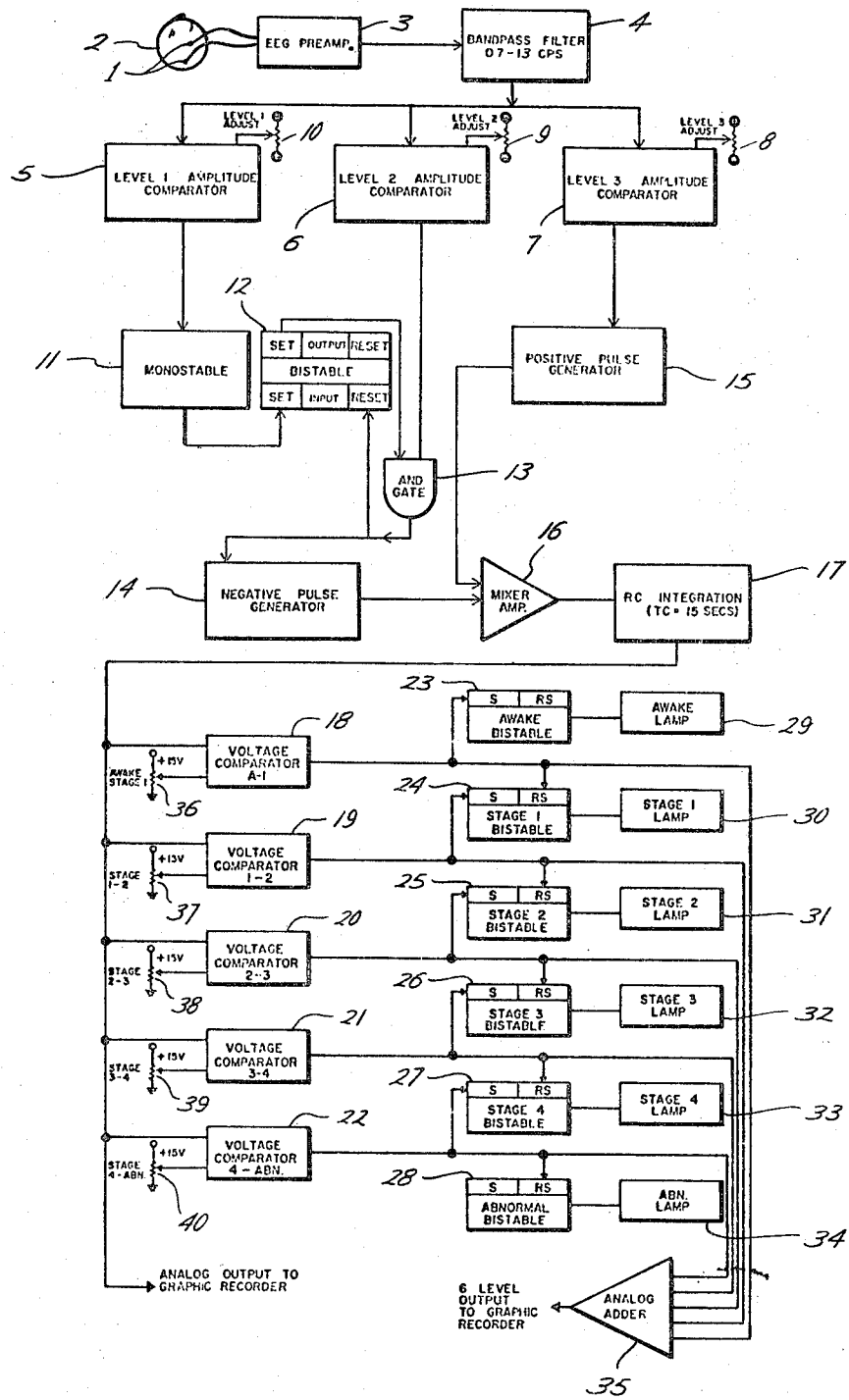
FIG. 7 is a block diagram of one apparatus embodiment of this invention.

FIG. 7 shows a block diagram of the apparatus of this invention. Conventional contact electrodes 1 are secured to the patient's skull 2 in the central and occipital regions in a conventional manner. The brain-wave activity detected by these electrodes is amplified by variable gain EEG preamplifier 3 and passes to bandpass filter 4. This filter may be either an active or passive network and has a frequency range of 0.7 to 13 cycles per second. Limitation of the signal to this frequency spectrum attenuates most electrode, movement and muscles artifacts, yet permits retention of enough information to allow accurate determination of sleep stages.

The filtered brain-wave signal from bandpass filter 4 is then led to level one amplitude comparator 5, to level two amplitude comparator 6, and to level three amplitude comparator 7. Each of the three comparators is set to provide an output signal upon receipt of brain-wave signals of predetermined negative amplitude. Level three amplitude comparator 7 is adjusted by variable resistor 8 to provide an output signal upon receipt of the highest magnitude negative amplitude signal, arbitrarily called 100 percent. Level two amplitude comparator 6 is adjusted by variable resistor 9 to provide an output signal upon receipt of a brain-wave signal 20 percent as large as the level three signal. The operating amplitude of the level one comparator 5 is adjusted by variable resistor 10 to operate at 1 percent of the level three value, just above the inherent noise level of the system. The gain of preamplifier 1 is adjusted for each subject being tested so that only the highest negative amplitude brain waves in his relaxed waking EEG signal exceed the threshold value of the level three amplitude comparator 7, with the majority of the EEG peaks falling between levels two and three. Thus, higher voltage waves present during deep sleep will frequently surpass the threshold of level three comparator 7, while the low-voltage activity present during the alert state or during stage I sleep will exceed the threshold of level one amplitude comparator 5 and level two amplitude comparator 6.

The output signal from level one comparator 5 and level two comparator 6 are then fed to a logic circuit comprised of monostable multivibrator 11, bistable multivibrator 12 and AND gate circuit 13, all of which are constructed in a conventional manner. Monostable multivibrator 11 is triggered each time it receives an output signal from level one amplitude comparator 5, which indicates a negative going EEG voltage in excess of the level one value. If bistable multivibrator 12 is in the reset condition, the output signal from monostable multivibrator 11 will trigger bistable multivibrator 12 into the set state, the output signal of which will be fed to AND gate circuit 13. If bistable multivibrator 12 is in the set state upon receipt of an output signal from monostable multivibrator 11, no change in the condition of bistable multivibrator 12 takes place and the output signal from the set side continues to be fed to AND gate 13.

The output signal from level two amplitude comparator 6 is fed directly to AND gate circuit 13. AND gate circuit 13 is designed to initiate an output signal only upon simultaneous receipt of a set signal from bistable multivibrator 12 and an output signal from level two amplitude comparator 6 (indicating a negative going EEG voltage in excess of level two value).

Bistable multivibrator 12 is reset by the output signal initiated by AND gate circuit 13, which signal also is used to actuate negative pulse generator 14. Therefore, this logic circuitry will provide a trigger signal to negative pulse generator 14 if, and only if, the preset amplitudes of amplitude comparators 5 and 6 are successively crossed in a negative going direction.

The logic functions performed by monostable multivibrator 11, bistable multivibrator 12 and AND gate circuit 13 may be accomplished as described above or through the use of a functionally equivalent circuit. For example, monostable multivibrator 11, bistable multivibrator 12 and AND gate circuit 13 may be replaced by a tunnel diode (not shown), the negative conductance characteristics of which would be utilized to provide the same function.

Negative pulse generator 14 is of a conventional design and is arranged to produce a single negative pulse of predetermined amplitude and duration upon receipt of a trigger signal from AND gate 13. The resultant effect is to cause the number of pulses produced by negative pulse generator 14 to be approximately proportional to the dominant frequency of the EEG signal and insensitive to minor variations or inflections.

Level three amplitude comparator 7 operates in a conventional manner, triggering positive pulse generator 15 each time the threshold level of level three amplitude comparator 7 is exceeded by the EEG signal. The output signal from positive pulse generator 15 is of the same duration as that of negative pulse generator 14 but is of opposite polarity and one-half the amplitude. The pulses from negative pulse generator 14 and positive pulse generator 15 are combined in mixer amplifier 16 to provide a composite pulse train.

Figure 8:
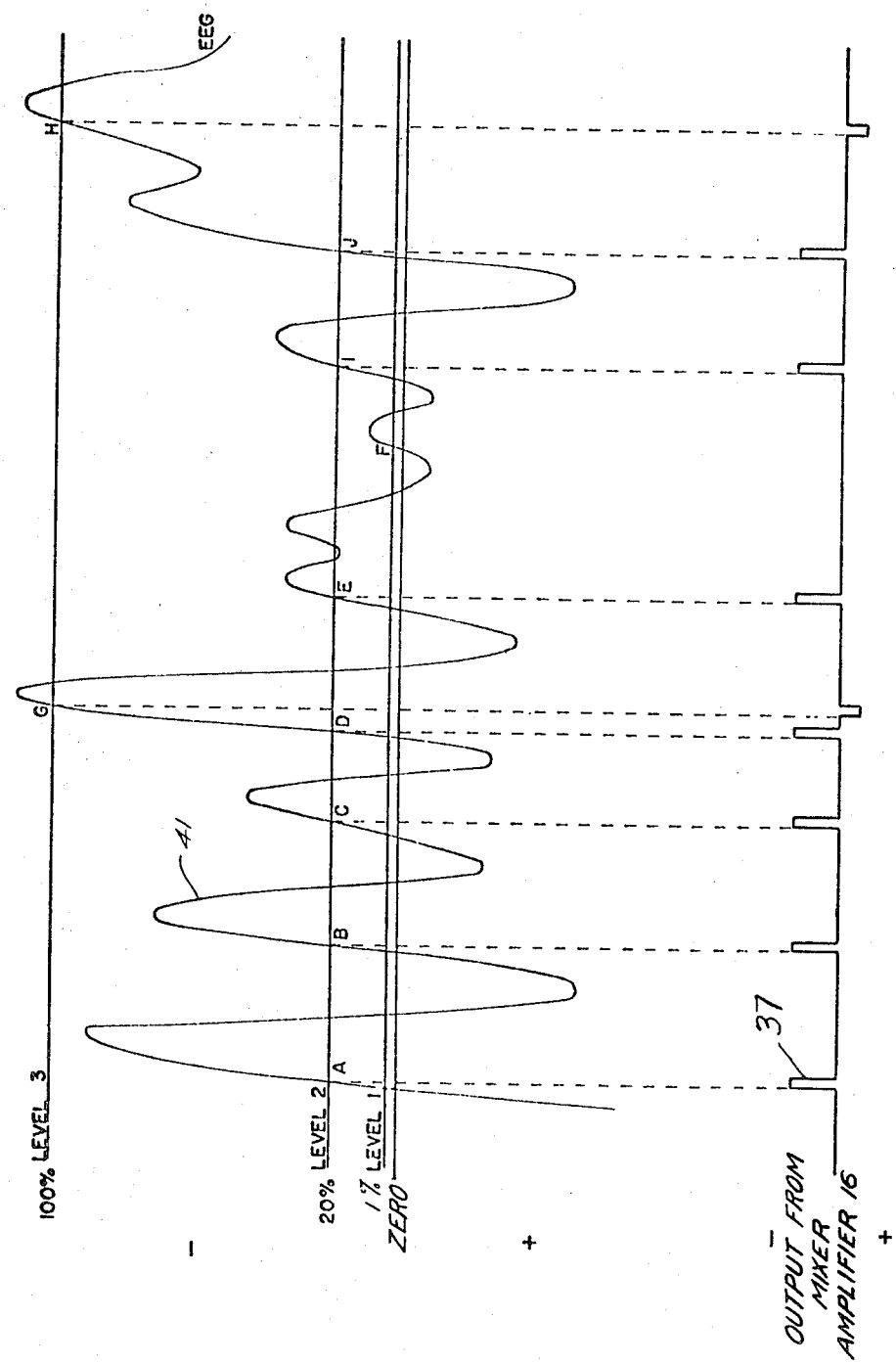
FIG. 8 is a graph showing a simplified EEG signal and corresponding pulsed output signal from mixer amplifier 16 shown in FIG. 7.

Upper line 41 of FIG. 8 illustrates a simplified EEG signal of varying amplitude and frequency with the preselected threshold levels of amplitude comparators 5, 6 and 7 indicated thereon. Lower line 37 of FIG. 8 indicates the output from mixer amplifier 16 corresponding to the EEG signal shown above. Negative pulses are generated each time the negative amplitude of the EEG signal successively surpasses levels one and two, e.g. points A, B, C, D, E, I and J. The positive pulse generator is triggered only when the negative amplitude of the EEG signal surpasses level three, e.g., points G and H. No pulses are generated corresponding to the EEG signal excursions between points E and I, since these fluctuations do not successively surpass levels one and two and do not surpass level three.

The output from mixer amplifier 16 (FIG. 7) is fed to integration circuit 17, which is a standard resistance-capacitance circuit selected for a 15-second time constant for rise and decay. Thus, the output from integration circuit 17 is a varying voltage signal which is primarily dependent upon the number and polarity of pulses received during the preceding 15 seconds.

Because of this slowly changing output, stage of sleep information could be adequately telemetered using, for example, as few as three samples per minute from the output of integrator circuit 17.

If only levels one and two are exceeded by the EEG signal, then the output of integrator circuit 17 is proportional to the dominant frequency. However, each time that level three is exceeded (thereby causing positive pulse generator 15 to supply an opposite polarity pulse of one-half the amplitude), the integrator loses one-half the value previously added by negative pulse generator 14. In operation with a complex input signal, waves which exceed only levels one and two will have the highest value in terms of increasing the output, while high voltage waves exceeding level three have only half the value, and very low voltage waves, below level two, have no value.

The output of integrator circuit 17 will have its highest value when the subject is awake and alert. At that time, the basic EEG signal, as shown in FIG. 1, is relatively low in voltage, but high enough to cross levels one and two, and is high in frequency. Thus, a high rate of negative pulses will be supplied to integration circuit 17. As the subject relaxes, the EEG appears as shown in FIG. 2 where the alpha rhythm becomes higher in voltage, causing more frequent crossings of level three and resulting the addition of positive pulses to integrator circuit 17, which slightly lowers the integrated output level thereof. As the subject becomes drowsy, the EEG amplitude again drops, as shown in FIG. 3, so that only levels one and two are crossed, but, in addition, the alpha signal is replaced by a slower 5 to 7 cycle per second irregular activity resulting in fewer negative input pulses to the integrator circuit 17. Therefore, the output from integrator circuit 17 decreases to a lower level.

Stage II, or light sleep, as shown in FIG. 4, is characterized by high voltage vertex transients, which results in more frequent crossings of level 3, and by a somewhat slower frequency. As a result, the output from integrator circuit 17 is again lowered in value. During stage III, or moderately deep sleep, as shown in FIG. 5, the dominant frequency becomes still slower and the amplitude greater, both of which result in a further reduction of the output from integrator 17. Stage IV, or deep sleep, illustrated in FIG. 6, with its very slow and high voltage activity causes the output from integration circuit 17 to reach its lowest normal value, since levels one and two have been crossed relatively few times and level three is crossed almost as frequently.

Certain abnormal conditions, such as coma, can produce even lower levels of output signals and, if the EEG signal becomes flat, the lowest possible level of zero volt output from the integrator circuit 17 is reached, since no pulses will be supplied thereto.

The output signal from integrator circuit 17 is, therefore, essentially an amplitude weighted, dominant frequency signal representative of the 0.7 to 13 cycles per second brain-wave band, with highest output resulting from a high frequency signal of intermediate amplitude. The level of consciousness of the individual is therefore expressed as a voltage level at the output of the integrator. The awake and alert state is accompanied by the highest output voltage, and progressively reduced levels of consciousness are accompanied by correspondingly lower output values from integration circuit 17. A typical output signal from integration circuit 17 is shown in the upper portion of FIG. 9, with horizontal grid lines defining the various clinically defined stages of sleep.

It is customary to clinically assess levels of consciousness in several discrete steps rather than in the continuous manner provided by the output of integration circuit 17. The remaining circuitry shown in FIG. 7 provides automatic readout means for performing this function.

Parallel connected voltage comparators 18—22 are of a conventional design and are arranged to provide output signals as long as the signal from integration circuit 17 surpasses the respective comparator's predetermined threshold level. The threshold level for each of comparators 18—22 is preset by corresponding potentiometers 36—40 to correspond to an integration circuit output signal transition point between two clinical stages. For example, if it is determined that an integrator circuit output signal range of 2.1 to 3.0 volts corresponds to an awake state, then potentiometer 36 is set to allow comparator 18 to trigger at 2.1 volts.

Similarly, if it is determined that an integrator circuit output voltage range of 1.7 to 2.1 volts represents stage I sleep, then potentiometer 37 is set to allow voltage comparator 19 to trigger at 1.7 volts. If integrator output voltage ranges of 1.2 to 1.7; 0.6 to 1.2; and 0.2 to 0.6 represent stages II, III and IV sleep, respectively, then potentiometer 38 would be adjusted for 1.2 volts, potentiometer 39 for 0.6 volts, and potentiometer 40 for 0.2 volts. The precise values and ranges for the comparators will depend on the details of circuit construction.

To initially adjust the potentiometers 36—40, a conventional EEG recording is made while the output of the integration circuit 17 is simultaneously recorded. The various EEG stages of sleep may then be determined by a human evaluator from the EEG record and correlated in time with the values from the integration circuit 17. As the subject passes from one stage of sleep to another, as determined by visual scoring criteria, the appropriate potentiometer is set to the then current output signal level from integration circuit 17.

Voltage comparators 18—22 are arranged to provide a positive 5-volt output signal if the input threshold level is not exceeded. If the output signal level from integration circuit 17 surpasses the threshold of a comparator, that comparator's output switches to zero volts.

The output from each voltage comparator 18—22 is fed to two of the bistable multivibrator circuits 23—28 shown in FIG. 7. Each of the six bistable circuits 23—28 corresponds to one of the six previously described classifications of level of consciousness (awake, stage I, stage II, stage III, stage IV, and abnormally slow EEG).

Each of the bistable circuits 23—28 remains in either of two stages, set (S) or reset (RS), depending upon the voltage received at the S input of the bistable multivibrator from the corresponding voltage comparator. If this level is +5 volts, the bistable circuit enters the reset state; if the level is zero volts, the circuits enters the set state. Additionally, each bistable circuit 23—28 has an RS input. A +5-volt signal at the RS input has no influence on the behavior of the circuit. However, a zero-voltage input forces the circuit into the reset state regardless of the S input level. Each bistable multivibrator except abnormal bistable multivibrator 28 performs as described above. Abnormal bistable multivibrator 28, which has no corresponding voltage comparator, is supplied with a fixed zero-volt signal to its S input and therefore remains in the set state at all times, unless it is inhibited by a zero-volt signal to its RS input from the voltage comparator above.

In addition, the condition of each of the bistable multivibrator circuits 23—28 is indicated by externally visible indicator lamps 29—34, respectively, which are turned on when the corresponding bistable multivibrator is in the set state. Thus, one lamp corresponds to each of the six level of consciousness classifications.

In operation, if the output signal from integration circuit 17 is zero volts, the output from voltage comparators 18—22 will all be at +5 volts. Thus, all bistable multivibrator circuits 23—28, except abnormal bistable 28, will be switched to the reset condition. Abnormal bistable 28, having a fixed zero-volt signal at its S input, will be in the set condition. Consequently, only the abnormal indicator lamp 34 will be illuminated, indicating an abnormal condition of the subject's brain, for example a deep coma or death.

If the output from integration circuit 17 rises into the stage IV range, voltage comparator 22 will switch to zero volts output, simultaneously setting bistable multivibrator 27 and resetting abnormal bistable multivibrator 28. As a result, abnormal indicator lamp 34 will be extinguished and the stage IV lamp 33 will light.

Similarly, other changes in the output level from integration circuit 17 will be converted into the proper clinical classification and signaled by the corresponding indicator lamp. For example, if the subject is alert and awake, the largest signal would be supplied by integration circuit 17 and all comparators will be switched to the zero-volt output level. Only awake bistable multivibrator 23 would then receive the proper signals to remain in the set condition, i.e., zero-volt S input and no RS input. Thus, only the awake lamp 29 would be illuminated.

In addition to providing means to actuate one of the indication lamps 29—34, representative of the level of consciousness, the outputs from voltage comparators 18—22 are added by a conventional analogue addition circuit 35. The inverted output from analogue addition circuit 35 provides a six level indication of level of consciousness.

When the output signal from integration circuit 17 is at its lowest level, the output of voltage comparators 18—22 will all be at +5 volts, and abnormal lamp 34 will be illuminated. Since all inputs to analogue addition circuit 35 are at +5 volts, its inverted output will be at the lowest level. If stage IV sleep is entered, analogue addition circuit 35 will receive a +5-volt signal from voltage comparators 18—21 and a zero-volt signal from voltage comparator 22. Thus, the inverted output will have a higher level. Similarly, the remaining levels of consciousness will be represented by a corresponding inverted output signal from the analogue addition circuit 35.

The six-level, stepped output from analogue addition circuit 35 may be conveniently used to actuate a conventional graphic recorder (not shown). A typical graphic recorder display is shown in the lower portion of FIG. 9 and corresponds to the typical integration circuit output signal shown in the upper portion of FIG. 9.

The foregoing description is to be construed as illustrative only, and further modifications and alternate embodiments of the invention will be apparent to those skilled in the art in view of this description.

I claim:

1. In an apparatus for quantitatively measuring brain activity as an indication of level of consciousness of a subject, the combination comprising:

means for sensing brain wave activity of the subject and generating a first signal representative thereof;

first means responsive to said first signal for generating second signals when the amplitude of said first signal successively surpasses two predetermined amplitudes;

second means responsive to said first signal for generating third signals when the amplitude of said first signal surpasses a third predetermined amplitude;

means operably connected with said first and second means for combining and integrating said second and third signals and generating an output signal representative thereof;

and, readout means responsive to said output signal for indicating variations in said output signal as indications of the level of consciousness of the subject being tested.

2. The invention as claimed in claim 1 wherein:
said second signals are of a first polarity and of predetermined amplitude and duration;
and, said third signals are of a second polarity and of predetermined amplitude and duration.

3. The invention as claimed in claim 1 wherein said first means includes a pair of amplitude comparator circuits each of which is connected to receive said first signal.

4. The invention as claimed in claim 1 wherein said means for sensing brain wave activity and generating a first signal includes filter means for rejecting unwanted components of said first signal.

5. In an apparatus for quantitatively measuring brain activity as an indication of level of consciousness of a subject, the combination comprising:
means for sensing brain wave activity of a subject and generating a first signal representative thereof;
filter means for rejecting unwanted components of said first signal;
first means responsive to said filtered signal for generating a first pulse of a first polarity and of predetermined amplitude and duration when the amplitude of said filtered signal successively surpasses two predetermined amplitudes;
second means responsive to said filtered signal for generating a second pulse of a second polarity and of predetermined amplitude and duration when the amplitude of said filtered signal surpasses a third predetermined amplitude;
means operably connected with said first and second means for combining and integrating said pulses and generating an output signal representative thereof;
and, readout means responsive to said output signal for indicating variations in said output signal as indications of the level of consciousness of the subject being tested.

6. The invention as claimed in claim 5 wherein said first means comprises:
first amplitude comparator means responsive to said filtered signal for providing a first reference signal as long as the amplitude of said filtered signal surpasses the first of said two predetermined magnitudes;
second amplitude comparator means responsive to said filtered signal for providing a second reference signal as long as the amplitude of said filtered signal surpasses the second of said two predetermined magnitudes, said second predetermined magnitude being larger than said first predetermined magnitude;
and, means for generating said first pulse in response to sequential receipt of said first and second reference signals.

7. The invention as claimed in claim 5 wherein said readout means comprises:
means for detecting the amplitude of said output signal within a series of predetermined amplitude ranges and producing a corresponding series of indication signals representative of output signal amplitudes larger than the lowest limit of each of said predetermined ranges;
and, means for indicating the presence of the indication signal corresponding to the highest value output signal amplitude range.

8. The invention as claimed in claim 7 including:
means for adding said indication signals;
and, means for recording said added signals as a function of time.

9. In an apparatus for quantitatively measuring brain activity as an indication of level of consciousness of a subject, the combination comprising:
means for sensing brain wave activity of the subject and generating a first signal representative thereof;
filter means for rejecting unwanted components of said first signal;
first amplitude comparator means responsive to said filtered signal for providing a first reference signal as long as the amplitude of said filtered signal surpasses a first predetermined magnitude;
second amplitude comparator means responsive to said filtered signal for providing a second reference signal as long as the amplitude of said filtered signal surpasses a second predetermined magnitude, said second predetermined magnitude being larger than said first predetermined magnitude;
means for generating first pulses of a first polarity and of predetermined amplitude and duration in response to sequential receipt of said first and second reference signals;
means responsive to said filtered signal for generating second pulses of a second polarity and of predetermined amplitude and duration when the amplitude of said filtered signal surpasses a third predetermined magnitude;
means for combining and integrating said first and second pulses and generating an output signal representative thereof;
means for detecting the amplitude of said output signal within a series of predetermined amplitude ranges and producing a corresponding series of indication signals representative of output signal amplitudes larger than the lowest limit of each of said predetermined ranges;
and, means for indicating the presence of the indication signal corresponding to the highest value output signal amplitude range.

10. The invention as claimed in claim 9 including:
means for adding said indication signals;
and, means for recording said added signals as a function of time.

11. In a method of quantitatively measuring brain activity as an indication of level of consciousness of a subject, the combination of steps comprising:
sensing brain wave activity of the subject and generating a first signal representative thereof;
generating second signals in response to said first signal when the amplitude of said first signal successively surpasses two predetermined amplitudes;
generating third signals in response to said first signal when the amplitude of said first signal surpasses a third predetermined amplitude;
combining and integrating said second and third signals and generating an output signal representative thereof;
and, reading out variations in said output signal as indications of the level of consciousness of the subject being tested.

12. The invention as claimed in claim 11 wherein:
said second signals are of a first polarity and of predetermined amplitude and duration;
and, said third signals are of a second polarity and of predetermined amplitude and duration.

13. The invention as claimed in claim 11 wherein the step of sensing brain wave activity and generating a first signal includes filtering said first signal to reject unwanted components thereof.

14. In a method of quantitatively measuring brain activity as an indication of level of consciousness of a subject, the combination of steps comprising:
sensing brain wave activity of the subject and generating a first signal representative thereof;
filtering said first signal to reject unwanted components thereof;
generating first pulses of a first polarity and of predetermined amplitude and duration in response to said filtered signal when the amplitude of said filtered signal successively surpasses two predetermined amplitudes;
generating second pulses of a second polarity and of predetermined amplitude and duration in response to said filtered signal when the amplitude of said filtered signal surpasses a third predetermined amplitude;

combining and integrating said first and second pulses and generating an output signal representative thereof;

and, reading out variations in said output signal as indications of the level of consciousness of the subject being tested.

15. The invention as claimed in claim 14 wherein said step of generating said first pulses comprises:

sensing the amplitude of said filtered signal and producing a first reference signal in response thereto as long as the amplitude of said filtered signal surpasses a first predetermined magnitude;

sensing the amplitude of said filtered signal and producing a second reference signal in response thereto as long as the amplitude of said filtered signal surpasses a second predetermined magnitude, said second predetermined magnitude being larger than said first predetermined magnitude;

and, generating said first pulses in response to sequential receipt of said first and second reference signals.

16. The invention as claimed in claim 14 wherein said step of indicating variations in said output signal comprises:

detecting the amplitude of said output signals within a series of predetermined amplitude ranges and producing a corresponding series of indication signals representative of output signal amplitude larger than the lowest limit of each of said predetermined ranges;

and, indicating the presence of the indication signal corresponding to the highest value output signal amplitude range.

17. The invention as claimed in claim 16 including:

adding said indication signals;

and, recording said added signals as a function of time.

18. In a method of quantitatively measuring brain activity as an indication of level of consciousness of a subject, the combination of steps comprising:

sensing brain wave activity of the subject and generating a first signal representative thereof;

filtering said first signal to reject unwanted components thereof;

sensing the amplitude of said filtered signal and producing a first reference signal in response thereto as long as the amplitude of said filtered signal surpasses a first predetermined magnitude;

sensing the amplitude of said filtered signal and producing a second reference signal in response thereto as long as the amplitude of said filtered signal surpasses a second predetermined magnitude, said second predetermined magnitude being larger than said first predetermined magnitude;

generating first pulses of a first polarity and of predetermined amplitude and duration in response to sequential receipt of said first and second reference signals;

generating second pulses of a second polarity and of predetermined amplitude and duration in response to said filtered signal when the amplitude of said filtered signal surpasses a third predetermined amplitude;

combining and integrating said first and second pulses and generating an output signal representative thereof;

detecting the amplitude of said output signal within a series of predetermined amplitude ranges and producing a corresponding series of indication signals representative of output signal amplitudes larger than the lowest limit of each of said predetermined ranges;

and, indicating the presence of the indication signal corresponding to the highest value output signal amplitude range.

19. The invention as claimed in claim 18 including:

adding said indication signals;

and, recording said added signals as a function of time.